United States Patent [19]

Steiner

[11] 4,209,662
[45] Jun. 24, 1980

[54] CIRCUIT ARRANGEMENT FOR SCANNING THE CHARACTER ELEMENTS OF CHARACTERS AT ARBITRARILY DETERMINABLE POINTS, IN PARTICULAR FOR THE CORRECTION OF TELETYPEWRITER CHARACTERS

[75] Inventor: Herbert Steiner, Gelting, Fed. Rep. of Germany

[73] Assignee: Siemens Aktiengesellschaft, Berlin & Munich, Fed. Rep. of Germany

[21] Appl. No.: 948,087

[22] Filed: Oct. 2, 1978

[30] Foreign Application Priority Data

Sep. 30, 1977 [DE] Fed. Rep. of Germany ....... 2744216
Feb. 28, 1978 [DE] Fed. Rep. of Germany ....... 2808566

[51] Int. Cl.² .......................... H04L 7/00; H04J 3/06; H04L 13/08
[52] U.S. Cl. .................................. 178/69 A; 375/106
[58] Field of Search ................. 178/26 R, 26 A, 17.5, 178/70 R, 69 R, 69 A, 69 N, 2 R, 2 B, 3, 69.1; 340/347 DD; 358/263, 264

[56] References Cited

U.S. PATENT DOCUMENTS

| | | | |
|---|---|---|---|
| 3,869,570 | 3/1975 | Nguyen-Tat et al. | 178/26 R |
| 3,912,863 | 10/1975 | Patience | 178/17.5 |
| 4,045,618 | 8/1977 | Lagarde et al. | 178/69.1 |
| 4,063,029 | 12/1977 | Elstner | 178/17.5 |

Primary Examiner—Thomas A. Robinson
Attorney, Agent, or Firm—Hill, Van Santen, Steadman, Chiara & Simpson

[57] ABSTRACT

A circuit arrangement for scanning the character elements of characters, respectively occurring within a prescribed duration, at arbitrarily determinable points, in particular for the correction of teletypewriter characters by means of scanning the individual character elements with the aid of scanning pulses output by an impulse generator, the scanning pulses being fed to a scanning circuit together with the individual character elements, provides that in the impulse generator a pulse-controlled multi-stage register is provided whose output side is connected to its input side by way of an adder circuit. The adder provides that the code words contained in the register can respectively be altered by a prescribed value with every pulse actuation. A memory, in the form of a programmable read only memory, is provided and has its input side connected to the output of the register, or of the adder circuit, and contains stored controlled signals in specified fixed storage locations which can be actuated by the code words of the register, or of the adder circuit. With the actuation of the respective storage locations, beginning after the start of a character has been determined, the control signals contained in the memory locations are caused to output impulses from the output side of the memory, which pulses are utilized as the desired scanning pulses.

8 Claims, 2 Drawing Figures

CIRCUIT ARRANGEMENT FOR SCANNING THE CHARACTER ELEMENTS OF CHARACTERS AT ARBITRARILY DETERMINABLE POINTS, IN PARTICULAR FOR THE CORRECTION OF TELETYPEWRITER CHARACTERS

The invention relates to a circuit arrangement for scanning the character elements of characters, respectively occurring with a prescribed duration, at arbitrarily determinable points, in particular for the correction of teletypewriter characters by means of scanning the individual character elements with the aid of scanning pulses output by an impulse generator, and which can be conveyed to a scanning circuit together with the individual character elements.

It is generally known for the scanning and simultaneous correction of teletypewriter characters forming start-stop-characters, that the polarity of the respective character element or character step is determined with the correct value with greatest probability by means of a center scanning of the individual character elements or character pulses. Arrangements operating according to this principle comprise a pulse generator, brought into operation by the start pulse of a character and which gives off a specific number of impulses. By counting these pulses, scanning pulses lying in the respective character element center, and a character end pulse determining the passage of a complete character, can then be formed. Taking characters according to the telegraph alphabet CCITT no. 2 and a pulse duration of T as a basis, seven scanning pulses are required of which the first scanning pulse is given off after 0.5T relative to the beginning of the start pulse, and the additional six scanning pulses are given off with the spacing of respectively 1T. If these scanning pulses are simultaneously utilized for the transmission of the polarity applied at the input of a scanning circuit or corrector circuit at the point in time for scanning, the corrected character is available, delayed by half a pulse length, at the output of the circuit. After one passage of this corrector circuit, thus after the appearance of seven scanning pulses, on the basis of the selected number sample, the respective corrector circuit is again brought into its initial position or rest position and is again started when the next start pulse of a character is determined. Counter circuits are normally utilized for making the scanning pulses available, said counter circuits being triggered when the start pulse of a character is determined and subsequently counting the system timing pulses given off by a pulse generator. In order to respectively give off a scanning pulse in the pulse center of a character element and in order to also give off an end pulse after scanning the total character, two counters are normally utilized of which the counter counting the number of pulses or character elements gives off a reset pulse at the end of a character, by means of which said reset pulse both counters are again reset for their initial position. Moreover, with the aid of this reset pulse, the scanning circuit is normally brought into a definite initial position, also. However, this presently considered normal circuit design requires a relatively high circuit technical expense. Moreover, in such a circuit arrangement an adjustment to characters occurring with different transmission speed or with a different format can only be obtained in a relatively cumbersome manner. Indeed, in both cases the provided counters must be correspondingly newly wired.

A circuit arrangement for the correction of start-stop characters by means of center scanning was already suggested (German application P 26 39 773.9), in which switching means are provided for the evaluation of a start pulse, for the scanning of the receiver line and for the evaluation of a selection by-pass criterion. For determining the point in time of scanning and the code frame or scanning frame, a store is thereby provided comprising at least n counting bits and one function bit. With the arrival of the start pulse of a character the function bit is set and the counting bits are brought into a definite initial position. The store content is read out with the control of a store pulse, and the value of the counting bits is respectively increased by 1. The function bit, and the counting bits increased by the value of 1, are then conveyed to a first or to a second comparator circuit. The first comparator circuit is thereby adjusted to a value corresponding with the pulse center, and the second comparator bit is adjusted to a value corresponding with the character end. The pulse for the switching means provided for the scanning of the receiver line is output via the first comparator circuit, and a character end impulse is output via the second comparator circuit, said impulse which is used as reset impulse for the switching means evaluating the start pulse of the character.

The present invention now shows a way how one can make do with even less circuit technical expense than in the presently considered, already suggested circuit arrangement, for the scanning of the character elements of a character, in particular for the correction of teletypewriter characters.

Accordingly, the invention has the underlying objective to show a way how to read, in a circuit arrangement of the initially mentioned type, character elements of characters, respectively occurring with a prescribed duration, which can be scanned at arbitrarily determinable points and how, in particular, teletypewriter characters can be corrected with less circuit technical expense than in the previously considered circuit arrangements.

The aforementioned objective is resolved in a circuit arrangement of the initially mentioned type according to the invention in that the impulse generator contains a pulse-controlled multi-stage register, whose output side is connected to its input side via an adder circuit, by means of which the code words, contained in the register, can respectively be altered by a prescribed value with every pulse actuation, that at the output side of the register or of the adder circuit a store is connected with its input side, and that the store contains stored control signals at specific fixed store locations which can be actuated by the code words of the register or of the adder circuit, that with the actuation of the respective store locations, beginning after the start of a character is determined, the control signals contained in said store locations are caused to output impulses from the output side of the store which are utilized as the desired scanning impulses. Thereby the advantage is obtained that one can make do with a particularly small circuit technical expense for the production of the scanning impulses to be conveyed to the scanning circuit. Moreover, the very use of the store mentioned brings about a simple possibility by altering the content of this store, i.e. by writing control signals into respectively desired store locations, that an adjustment of the output of control signals to characters with different formats and speeds can rapidly be obtained. Thus, for example, it is possible to form the store mentioned by means of an inexpensive exchangeable programmable read store. For the scanning of characters having different formats and/or transmission speeds, it is then sufficient to insert the store, to be considered for the scanning of the character elements of the respective character, into the present circuit arrangement.

In accordance with one expedient embodiment of the invention, the impulses, output by the store, are linked with separate auxiliary timing pulses according to coincidence in order to form the scanning pulses; the auxiliary timing pulses thereby occur with the same frequency as the timing pulses conveyed to the register mentioned, however, the auxiliary timing pulses are phase-displaced vis-a-vis the timing pulses. By this measure the advantage of an interference-free operation results when the scanning pulses mentioned are produced. Indeed, merely definite impulses for the formation of the scanning pulses mentioned are called upon by the store.

In accordance with an additional expedient inventive embodiment, the store outputs a separate character end signal after the output of the scanning pulses used for scanning all the character elements of a character, said character end signal by means of which the actuation of the store can be brought to a stop until an additional character to be scanned is determined. Thereby results the advantage that for the scanning of the characters one can respectively proceed from definite circuit conditions, which indeed is very important for the evaluation of the beginning of an appearing character.

In accordance with an additional expedient inventive embodiment, a monitor circuit having a bistable multivibrator circuit is provided in order to determine the appearance of a character to be scanned, said multivibrator circuit which is set into a definite condition when the first character element of a character to be scanned is determined, and thus the actuation of the store is released in order to output the impulses mentioned, said multivibrator circuit being set to its initial condition immediately upon the release of the actuation of the store and is retained in this condition until the end of the appearance of the respective character. Thereby results the advantage of a particularly small circuit technical expense for a monitor circuit used for determining the respective character beginning.

Another additional expedient inventive embodiment is characterized in that the addition circulating circuit contains a read/write store actuatable when addressed, which exhibits a number of store segments which correspond with the number of lines conveying characters to be scanned, and which can effectively be controlled towards the appearance of characters to be scanned by selectively examining the individual lines. The addition circulating circuit is connected at its input side, via a monitor circuit containing a multiplexer, with all lines on which characters to be scanned can appear. The store is actuated and addressed from the side of the addition circulating circuit which outputs the respective scanning impulses via a demultiplexer, and outputs the impulses mentioned. An address generator is provided to output addresses for the consecutive activation of all store segments of the read/write store in cyclical sequence respectively during a duration which is shorter than the duration of the shortest duration of a character element of a character to be expected and to output addresses for actuation of the multiplexer and of the demultiplexer such that consecutively all signal inputs of the multiplexer are connected with its signal output, and all signal outputs of the demultiplexer are connected with its signal input.

The invention provides the advantage that one can make do with a relatively small circuit technical expense in order to have the necessary scanning pulses ready for the scanning of the character elements of characters occurring on a multiplicity of lines. Indeed, the invention can thereby make do with one single impulse generator which supplies all scanning pulses at the points in time at which characters or their character elements to be scanned appear in multibly provided lines. Thereby merely scanning circuits, for example, in the form of simple multivibrator circuits, are individually to be assigned to their respective lines.

In accordance with an expedient further development of the invention, the demultiplexer and the read/write store are additionally pulse-controlled. Thereby results the advantage that always definite signal conditions can be made available at the outputs of the demultiplexer and of the read/write store for a further processing.

In accordance with an additional expedient inventive embodiment, a pulse-controlled auxiliary register is provided between the output side of the read/write store and of the adder circuit of the addition circulating circuit and also of the input side of the read/write store. Thereby results the advantage that one can make do with a relatively simple, dynamically operating circuit arrangement for the read/write store and, if necessary, for the adder circuit, said circuit arrangements which respectively output information only in the form of impulses. Such impulses can be held for a rewriting into the read/write store by means of the respective auxiliary register.

BRIEF DESCRIPTION OF THE DRAWINGS

Other objects, features and advantages of the invention will be best understood from the following detailed description, taken in conjunction with the accompanying drawings, on which.

Figure 1:
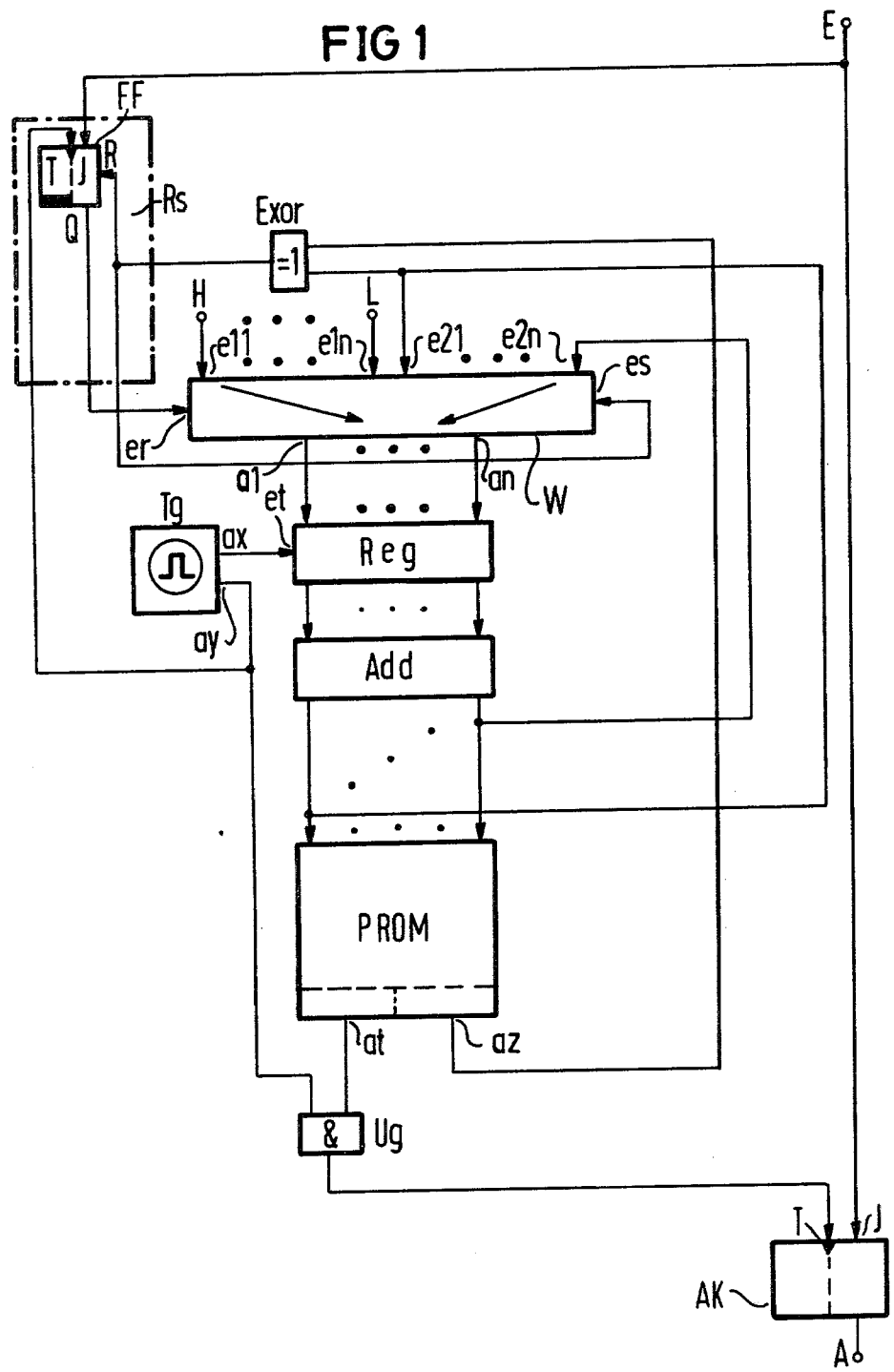
FIG. 1 is a schematic block diagram of a circuit arrangement constructed in accordance with the present invention.

Characters to be scanned are conveyed to an input terminal E of the circuit arrangement illustrated in FIG. 1, which said characters respectively have character elements appearing with a prescribed duration. These character elements, from the input terminal E to the input J reach a bistable multivibrator circuit AK which represents a scanning circuit. In response to the scanning pulses fed to the pulse input T of this multivibrator circuit AK, the multivibrator circuit is set corresponding to the binary value of their respective character element and thus the output of a corresponding output signal is provided at an output terminal. A connected to the output of the multivibrator circuit.

The remaining circuit to be considered as impulse generator and illustrated in FIG. 1 is used for making the scanning impulses available. This circuit, among other things, comprises a pulse-controlled multi-stage register Reg which, for example, can contain twelve register stages. This register Reg is connected with a pulse input et to a pulse output ax of a pulse generator Tg. Register Reg is connected to outputs a1 through an of a transfer circuit W with signal inputs not specifically referenced in FIG. 1. Register Reg is connected to inputs e21 through e2n of the transfer circuit W via an adder circuit Add which can be a 1-adder circuit. Transfer circuit W exhibits additional inputs e11 through e1n. Depending upon the setting or the actuation of this transfer circuit W, its outputs a1 through an are either connected to its inputs e21 through e2n or to its inputs e11 through e1n or, however, the respective transfer circuit W is forced to output binary signals 0 by all its outputs a1 through an. This will subsequently be more precisely explained.

A store PROM, designed here as a programmable read store, is connected at the output of the adder circuit Add with its input side via which store locations, forming this store, can be addressed or actuated. Code words, respectively output by the adder circuit Add are used in the present case for the actuation of the individual store locations of the store PROM. However, it is also possible to actuate the store PROM directly by the output of the register Reg.

The store PROM, in the present case, may contain a multiplicity of store locations respectively having two store cells. Said store can exhibit, for example, 4096 store locations. Respectively corresponding store cells of all store locations output, in response to a corresponding actuation, the control signals or bits, contained therein, to one and the same output. Accordingly, the store PROM exhibits two outputs at and az. At the output at of the store PROM, a AND element Ug is connected with its one input. The other input of this AND-element Ug is connected to a pulse output ay of the pulse generator Tg. Timing pulses having the same frequency appear at this pulse output ay of pulse generator Tg, said frequency with the aid of which timing pulses are output by the output ax of the pulse generator Tg. However, the timing pulses appearing at the output ay of pulse generator Tg are to be phase-displaced by 180°, for example, vis-a-vis the timing pulses appearing at the pulse output ax. The output of the AND element Ug mentioned is connected to the pulse input T of the multivibrator circuit AK, already mentioned.

The output az of the store PROM is connected to one input of an exclusive OR element Exor. The other input of this exclusive OR element Exor is connected to the output of the adder circuit Add, which is connected to the input e21 of the transfer circuit W.

The transfer circuit W exhibits two inputs es and er for its adjustment, said two inputs are connected to control outputs of the monitor circuit Rs, not specifically referenced in the drawing. The one input er (reset-input) of the transfer circuit W is connected to the output Q of a bistable multivibrator circuit FF, which is part of the monitor circuit Rs. This multivibrator circuit FF is connected to the output of the exclusive-OR element Exor with a reset input R. The control output of the two control outputs of the monitor circuit Rs, not yet reviewed, is additionally connected to this output of the exclusive-OR element Exor. The input es (set input) of the transfer circuit W is connected to this other control output of the monitor circuit Rs. The bistable multivibrator circuit FF is connected with its one input J to the input terminal E. The multivibrator circuit FF is connected with its pulse input T to the pulse output ay of the pulse generator Tg.

The mode of operation of the circuit arrangement illustrated in FIG. 1 is now to be more closely reviewed. Thereto we firstly assume that the respective circuit arrangement is in its rest condition in which the store PROM respectively outputs one binary signal 1 from all its outputs, and that the monitor circuit Rs is in its monitoring condition in which the multivibrator circuit FF can be adjusted by a signal conveyed to its input J. In this monitoring condition, the output Q of the multivibrator circuit FF outputs a binary signal 0. As binary signals 1 are connected to the two inputs of the exclusive-OR element Exor, a binary signal 0 appears at the output of this logic element. Thereby the two inputs er and es of the transfer circuit W respectively convey a binary signal 0 which brings about that binary signals 0 respectively appear at the outputs a1 through an of this transfer circuit W.

If now a character appears at the input terminal E, a transition from the stop polarity to the start polarity may occur during the processing of teletypewriter characters, the multivibrator circuit FF is thus reversed from its existing reset position to the set position, whereby a binary signal 1 is to be conveyed to the reset input er of the transfer circuit W. By the appearance of this binary signal 1, the inputs e11 through e1n of the transfer circuit W are to be connected with its output a1 through an. The code word abutting the inputs e11 through e1n of the transfer circuit W: indicated by a binary signal H and by a binary signal 0: is thus loaded into the register Reg when the next timing pulse appears at the pulse input et of this register. A specific value is added to this code word with the aid of the adder circuit Add and the code word, thus obtained, is conveyed to the inputs e21 through e2n of the transfer circuit W and also to the input side of the store PROM. In this code word a binary signal 1 is to appear on the line: under the conditions indicated in the drawing: which is connected to the input e21 of the transfer circuit W. The appearance of this binary signal 1 causes that the exclusive-OR element Exor output a binary signal 1. Thereby the multivibrator circuit FF is again brought into its reset position in which it remains during the duration of the appearance of this binary signal 1. Moreover, the respective binary signal 1 appears at the setting input es of the transfer circuit W. Meanwhile a binary signal 0 is conveyed to the reset input er of the transfer circuit W. Thereby the outputs a1 through an of the transfer circuit W are now connected to its inputs e21 through e2n. Thus, the code word abutting these inputs of the transfer circuit W reaches the register Reg, which takes over this code word when the next timing pulse appears at its pulse input et. Thereby simple addition processes proceed in the addition circuit loop considered, whereby the register content of register Reg is increased step-by-step with each additional timing pulse conveyed to it.

The code words, respectively output by the adder circuit Add are used, as already mentioned, for the actuation of the store locations of the store PROM. Very specific store locations are occupied with specific control signals or control bits in this store PROM. In order to produce impulses at the output at of the store PROM, a binary signal 1 is situated in the store locations to be considered, on the basis of the conditions indicated in the drawing, in the respective left store cell. Such a binary signal 1 appears at the output at of the store PROM by actuation of the store location, respectively, to which this store cell belongs. The respective binary signal 1 can thereby respectively occur until the actuation of an additional store location of the store PROM. In conjunction with the (auxiliary) timing pulses occurring at the pulse output ay of the pulse generator Tg, the impulses occurring at the output at of the store PROM lead to the output of scanning impulses after a coincident linkage with the aid of the AND element Ug, said scanning pulses which are conveyed to the pulse input T of the bistable multivibrator circuit AK.

As already stated, very specific store locations of the store PROM are occupied with control signals or control bits 1. The position of these store locations or store points within the store PROM, and indeed in relation to a store location actuation cycle in which all store locations of the store PROM are successively actuated, thereby determines, so to speak, the point in time of the appearance of a scanning pulse at the pulse input T of the bistable multivibrator circuit AK. By a corresponding selection of these store locations of the store PROM, an adjustment of the scanning pulses to be respectively output to practically every character format and to practically every transmission speed can thus proceed, with the aid of which the character elements of the respective character appearing at the input terminal E, occur.

The store PROM may now output, after the output of the number of impulses required for the scanning of the character elements of a character, an additional separate signal, a so-called character end signal, by its output az. This character end signal which may appear as binary signal 1, together with the binary signal 1 which, according to the assumption, also occurs at the output of the adder circuit Add which is connected to the input e2l of the transfer circuit W, effects that the exclusive-OR element Exor again outputs a binary signal 0, whereby the forced retention of the multivibrator circuit FF belonging to the monitor circuit Rs, ceases. This effects, moreover, that now a binary signal 0 respectively abuts the two inputs er, es of the transfer circuit W. This brings about that the transfer circuit W respectively outputs a binary signal 0 by its outputs al through an. The addition circuit considered is thereby interrupted. Not until the multivibrator circuit FF of the monitor circuit Rs reaches its set position from its reset position due to the recognition of an additional appearing character, the processes, described above, proceed anew. The store PROM again outputs binary signals 0 by its outputs, whereby the exclusive-OR element Exor again outputs a binary signal.

In conjunction with the aforementioned conditions it finally is to state that the utilization of a character end signal and of the exclusive-OR element Exor can be spared in principle if it is safeguarded that the register Reg outputs a binary signal 0 to the input e21 of the transfer circuit W via the adder circuit Add in accordance with the number of addition circulating processes corresponding with a character end. This binary signal 0 then carries out the same control processes, which were previously explained in conjunction with the exclusive-OR element Exor.

Figure 2:
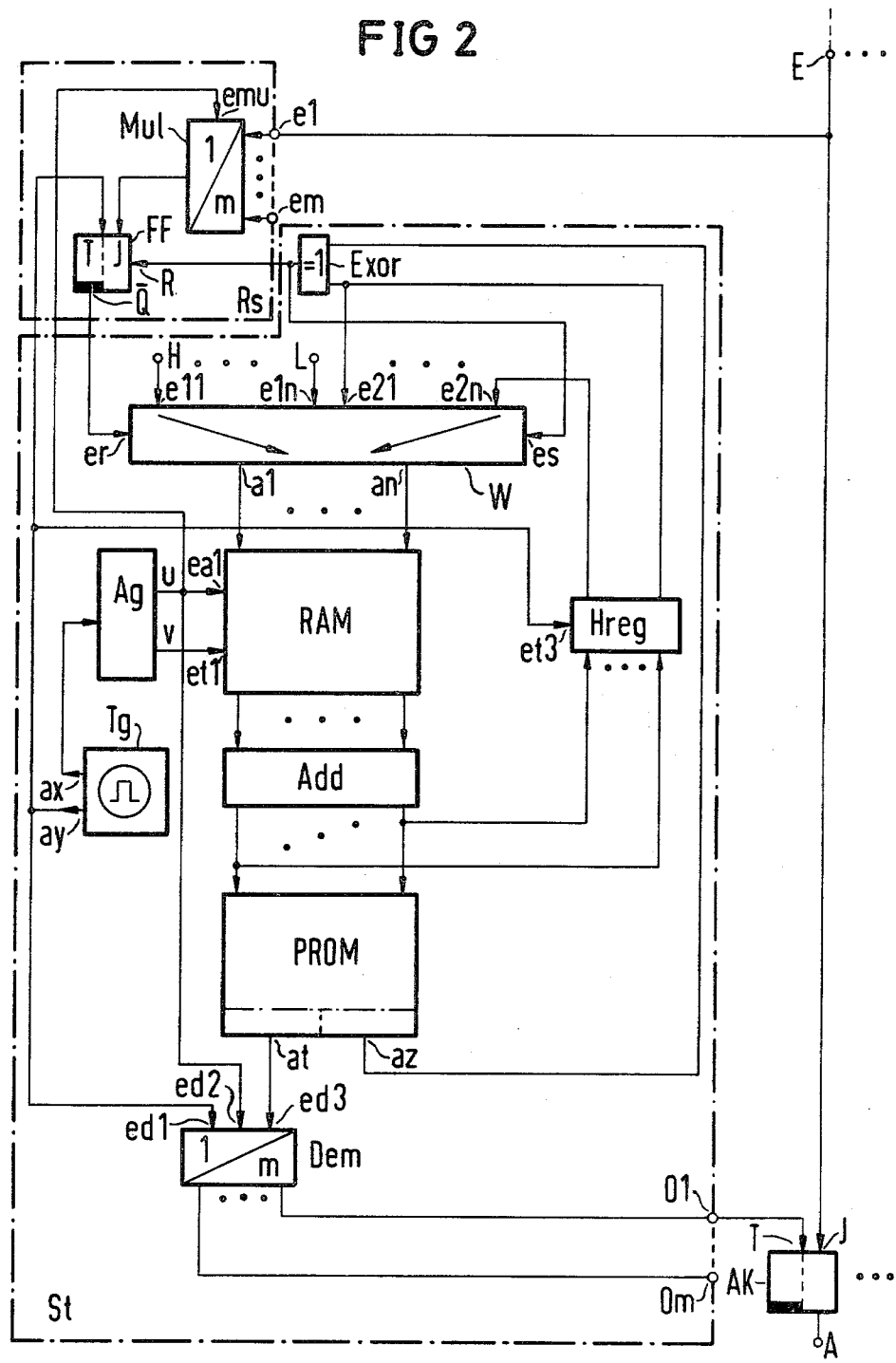
FIG. 2 is a circuit block diagram of another embodiment of the invention.

The circuit arrangement illustrated in FIG. 2 is used as the circuit arrangement illustrated in FIG. 1, to scan character elements of characters, in particular of teletypewriter characters, and to carry out a correction of such character elements. However, in the present case characters are to be dealt with which occur on a multiplicity of incoming transmission lines. For overview's sake, FIG. 2 merely indicates such an incoming transmission line with an input terminal E. A bistable scanning multivibrator circuit AK, which belongs individually to the respective incoming transmission line having an input J, is connected to this input terminal E. Together with the scanning pulses conveyed to the pulse input T of this multivibrator circuit AK, a setting of this multivibrator circuit results, which corresponds with the binary value of the character element respectively appearing at the input terminal E, and thus the output of a corresponding output signal results by an output terminal A, which is connected to the output of this multivibrator circuit AK.

In order to make the scanning pulses available, and indeed for all of the multivibrator circuits which correspond with the previously considered multivibrator circuit AK, which are individually assigned to the incoming transmission lines, provided in a multiplicity, the remaining circuit, illustrated in FIG. 2, is used, which exhibits a control circuit St, to be considered as impulse generator, and a monitor circuit Rs connected in series to this control circuit St. This circuit component, which comprises the control circuit St and the monitor circuit Rs can thus be considered as the central circuit component, so to speak. In the following we firstly wish to consider the design of this circuit component.

The control circuit St, as the earlier described circuit arrangement, exhibits a transfer circuit W, which is blocked at its inputs es and er, depending upon its setting or actuation, respectively, or permits a connection of its outputs a1 through an either to its inputs e11 through e1n or to its inputs e21 through e2n. A specific fixed code word, indicated by a bit 1 at the input e11 and by a bit 0 at the input e1n abuts the inputs e11 through e1n of the transfer circuit W in the present case, also.

The transfer circuit W is connected with its input er to an output of the already mentioned monitor circuit Rs, and is connected to an output $\bar{Q}$ of a bistable multivibrator circuit FF within this monitor circuit Rs. This bistable multivibrator circuit FF is connected with one input J to the output of a m-to-1 multiplexer Mu1. The multivibrator circuit FF is connected with its pulse input T to a pulse output ay of a timing pulse generator Tg. This pulse output ay supplies (auxiliary) timing pulses having the same frequency as the timing pulses which occur at an additional output ax of the timing pulse generator Tg. However, the timing pulses, occurring at the pulse output ay, are phase-displaced, for example, by 180° vis-a-vis the timing pulses occurring at the pulse output ax.

The multiplexer Mu1 belonging to the monitor circuit Rs is connected with a number m of signal inputs to the inputs e1 through em of the monitor circuit Rs. Each of these inputs e1 through em of the monitor circuit Rs may be connected to one of the incoming transmission lines provided in a corresponding number, on which characters may occur, whose character elements are to be scanned or to be corrected. The multiplexer Mu1 is connected with an address input emu at the output m of an address generator Ag. The address generator Ag is connected at its input side to a pulse output ax of the timing pulse generator Tg. Thus, the output of addresses is synchronized with the timing pulse output by the proceeding pulse control of the address generator Ag. At an additional output n, the address generator Ag outputs a read impulse with every address and subsequently outputs a write impulse. The number of addresses output by the address generator Ag during one address circulating cycle corresponds, moreover, with the number of signal inputs of the multiplexer Mu1. Thus, with the respective address output is guaranteed that the signal inputs of the multiplexer Mu1 are consecutively connected with its signal output.

A read/write store RAM with its signal inputs is connected at the outputs a1 through an of the transfer circuit W. This read/write store RAM is connected with an address input ea1 at the output m of the address generator Tg. The store RAM is connected with a control input et1 to the previously mentioned output n of the address generator Ag. The store RAM exhibits several store segments which can be actuated when addressed, whose number corresponds with the number of lines on which characters to be scanned can occur, and to which the presently considered circuit arrangement is jointly assigned. The individual store segments of store RAM have respectively one capacity for accommodating the code word respectively conveyed by the transfer circuit W; such a code word, for example, can consist of 12 bits.

An adder circuit Add is connected with its input side to the output side of the store RAM. In the present case, the adder circuit Add may also be a 1-adder circuit. The outputs of the adder circuit Add are connected to the already mentioned inputs e21 through e2n of the transfer circuit W via an auxiliary register Hreg, which is connected with a pulse input et3 to the pulse output ay of the timing pulse generator Tg. Moreover, the outputs of the adder are connected to the inputs of an additional read store PROM designed as programmable store. However, this store PROM can also be directly connected with its input side to the output side of the read/write store RAM. The respective read store PROM may exhibit a multiplicity of store locations having respectively two store cells. In the present case, for example, it can exhibit 4096 store locations—and indeed as the read store PROM in the circuit arrangement described in the above-mentioned patent. Store cells of the store locations of the store PROM respectively corresponding with one another may output the control signals or bits contained therein to one and the same output of the respective store when they are actuated. Accordingly, the store PROM exhibits two outputs at and az. A 1-to-m demultiplexer Dem with a signal input ed3 is connected at the output at of the store PROM. This demultiplexer Dem is connected with an address input ed2 at the output m of the address generator Ag. The demultiplexer Dem with a pulse input ed1 is connected to the pulse output ay of the timing pulse generator Tg which supplies the auxiliary timing pulses. The m outputs of the demultiplexer Dem are respectively connected to one of m scanning impulse outputs O1 through Om of the control circuit St. In the present case, the scanning multivibrator circuit AK, illustrated in the drawing, is connected with its pulse input T to the scanning pulse output O1 of the control circuit St.

The output az of the store PROM is connected to an input of an exclusive-OR-element Exor. The other input of this exclusive-OR element Exor is connected to the output of the auxiliary Hreg, which is connected to the input e21 of the transfer circuit W. The output of the exclusive-OR element Exor is connected to the input es of the transfer circuit W, and is connected with a reset input R of the bistable multivibrator circuit FF which belongs to the monitor circuit Rs.

We now wish to explain more precisely the mode of operation of the circuit arrangement illustrated in FIG. 2. Thereto is firstly assumed that this circuit arrangement is in rest condition, in which respectively one binary signal 1 is connected to the two inputs er and es of the transfer circuit W, and that binary signals 1 are respectively also present at the outputs a1 through an of this transfer circuit W. This brings about that the addition circulating circuit, which comprises the read/write store RAM, the adder Add, the auxiliary register Hreg and the transfer circuit W, are interrupted, so to speak, and that the read store PROM is neither addressed nor actuated for the output of output impulses. Additionally it may be assumed that all outputs of the store PROM respectively output one binary signal 1 and that the monitor circuit Rs is in its monitoring condition, in which the multivibrator circuit FF can be set by means of a signal L to be conveyed to the input J of said circuit. In this monitoring condition, the output $\overline{Q}$ of the multivibrator circuit FF outputs a binary signal 1—this being the reason why respectively one binary signal 1 is connected to the two inputs er and es of the transfer circuit W.

We now assume that on one of the provided incoming transmission lines and indeed on the incoming transmission line, for example, which is connected to the input terminal E, a character occurs, whose character elements are to be scanned and, if necessary, are to be corrected. However, in regard to such characters is to presuppose that their character elements occur with a prescribed, known duration. In the case of 50 Bd characters, the individual character elements of the respective characters have a duration of 20 ms. In this context we wish to remark at this point, that the speed of the address output by the address generator Ag depends upon the duration of the shortest character element of a character to be expected, whose character elements are to be scanned. Within one such time span, which, on the basis of the previously given number sample is 20 ms, the address generator Ag must repeatedly output those addresses by means of which all signal inputs of the multiplexer Mu1 are consecutively connected with its signal output, and all signal outputs of the demultiplexer Dem are connected with its signal input. During their respective time span, all store segments of the read/write store RAM are then also consecutively actuated in an addressed form.

The character occurring at the input terminal E, according to our assumption, is recognized due to the occurrence of a polarity alteration. In case teletype characters are processed, this is characterized by the transition from the stop polarity to the start polarity. When the address generator Ag outputs that address which connects the signal input of the multiplexer Mu1, which is connected to the input terminal E, with its signal output, the multivibrator circuit FF is brought into its setting position as long as said circuit is not already in this position on the basis of a preceding corresponding actuation. Thereby the outputs a1 through an of the transfer circuit W are now connected with its inputs e11 through e1n.

During the output of the presently mentioned address by the address generator Ag, which firstly outputs a read command or a read impulse to the control input et1 of the store RAM by means of which is effected that the content of the presently addressed store segment of the store RAM is read out. This store content may firstly be provided by a code sequence merely consisting of binary signals 0. The respective code sequence reaches then the auxiliary register Hreg via the adder circuit Add by which said code sequence is taken over when the auxiliary timing pulse, occurring in direct sequence, occurs at the pulse input et3. However, the code sequence situated in the auxiliary register Hreg does not reach the signal input side of the store RAM via the transfer circuit W, as the transfer circuit W is still blocked or is already switched through such that its outputs a1 through an are connected with its inputs e11 through e1n. With the subsequently occurring write command at the control input et1 of the store RAM, the code sequence abutting the inputs e11 through e1n of the transfer circuit W are written into the still addressed store segment of the store RAM.

If the address generator Ag re-outputs the address which characterizes the presently considered store segment of the store RAM, a read command is conveyed to the control input et1 of the store RAM with the aid of this address output—as, moreover, with each different address output—and, as a consequence of the occurrence of the read command, the code sequence, which is stored in the respective store segment of the store RAM, is read out and output via the adder circuit Add. Thereby the read store PROM is actuated in an addressed form, on one hand, and this code sequence, enlarged in its value, reaches the auxiliary register Hreg, on the other hand, in which it is taken over at the pulse input et3 with the occurrence of the next auxiliary timing pulse. In this code sequence, the bit to be conveyed to the input e21 of the transfer circuit W, may be a 1 bit. As at this point in time an additional 0-bit is output by the output az of the store PROM, the exclusive-OR element now outputs a "1" bit at its output side. Thereby the multivibrator circuit FF of the monitor circuit Rs is reset to its initial position, so to speak, for the presently monitored incoming transmission line. The transmission line respectively monitored is that line which actuates the input J of the multivibrator circuit FF via the correspondingly addressed multiplexer Mu1. By this resetting of the multivibrator circuit FF a binary signal 0 is again conveyed to the (reset) input er of the transfer circuit W. However, a binary signal 1 is now conveyed to the (set) input es of the transfer circuit W by the output of the exclusive-OR element Exor. This brings about that the outputs a1 through an of the transfer circuit W are now connected with its inputs e21 through e2n. Thereby the code sequence, still situated in the auxiliary register Hreg, reaches the store RAM via the transfer circuit W. The respective code sequence is written into the store segment of the store RAM, still addressed, with the aid of the directly following output of an additional write command to the control input et1 of the store RAM.

In the read store PROM, which is actuated by the code words or code sequences in an addressed form, respectively output by the adder circuit Add, very specific store locations are occupied with specific control signals or control bits. In order to produce impulses at the output at of the store PROM, a binary signal 1 is situated at the store locations to be considered—in the respective left store cell on the basis of the conditions indicated in FIG. 2. Such a binary signal 1 occurs at the output at of the store PROM respectively by actuation of the store location to which this store cell belongs. The respective binary signal H thereby respectively only occurs during the duration of the addressed actuation of the store PROM. Together with the address which is present at the respective point in time and the auxiliary timing pulse presently output by the timing pulse generator Tg, the respective binary signal 1 reaches the output of the demultiplexer Dem, characterized by the address, and thus reaches one of the scanning pulse outputs O1 through Om of the control circuit St.

The position of the store locations or store points within the store PROM relative to a store actuation cycle in which all store locations of the store PROM are consecutively actuated, determines the points in time of the occurrence of scanning pulses at the scanning pulse outputs O1 through Om of the control circuit St. If, for example, the character elements of characters occurring on 8 incoming transmission lines are to be scanned and if necessary are to be corrected, this means, under consideration of the above-mentioned number sample, that one scanning pulse occurs at the scanning pulse outputs O1 through Om of the control circuit St in sequence at a cycle time of 1.25 ms respectively during the duration of 1.25/8 ms. This holds true for the correction of 50 Bd characters; if characters with a higher transmission speed occur on the incoming transmission lines, the scanning pulses are to be made available at the scanning pulse outputs in a correspondingly shorter cycle time span.

The store PROM outputs an additional separate signal, a so-called character end signal by its output az after the output of the number of impulses or binary signals 1 by its output at necessary for the scanning of the character elements of a character. This character end signal which may occur as binary signal 1, together with the binary signal 1 yet to occur according to the assumption at the output of the auxiliary register Hreg, which is connected to the input e21 of the transfer circuit W, with the respective output of a code word to the transfer circuit W effects that in that case the exclusive-OR element Exor again outputs a binary signal 1. Thereby the forced retention of the multivibrator circuit FF belonging to the monitor circuit Rs ceases for the respective incoming transmission line mentioned. Moreover, the transfer circuit W again conveys respectively one binary signal 0 at the two inputs er, es. Thus, the initial condition of the respective circuit arrangement is again produced. Independently, whether in connection thereto a character again occurs on the incoming transmission line considered, the code word still stored in the respective store segment of the store RAM is read out from this store RAM by the address generator Ag when the address, belonging, so to speak, to this incoming transmission line, occurs, and said code word is conveyed to the auxiliary register Hreg via the adder circuit Add, wherefrom, however, this code word can no longer be conveyed to the store RAM via the transfer circuit W. Thereby the respective store segment of the store RAM is also erased.

The mode of operation of the circuit arrangement illustrated in FIG. 2 was explained in the aforementioned for the case that character elements to be scanned have occurred on merely one of the incoming transmission lines, present in toto. However, nothing in principle is altered in the mode of operation considered in that corresponding character elements to be scanned occur on several or all of the present incoming transmission lines. Indeed, for the respective incoming transmission line an individual actuation of the respective store segment with the corresponding address output proceeds in the store RAM, and also an individual actuation of the exclusive-OR element Exor of the multivibrator circuit FF belonging to the monitor circuit Rs and of the transfer circuit belonging to the control circuit St. Moreover, by the output of the addresses by the address generator Ag, proceeding in a sufficiently great frequency, is guaranteed that the individual character elements are respectively scanned, at least approximately, in their center, which is often necessary for a proper scanning and correction of character elements.

The present invention is not delimited to the aforementioned case of employ, thus to the scanning of characters or their character elements. Rather, the present invention can also be called upon to respectively output a separate output impulse sequence to outputs, i.e. the scanning impulse outputs in the sample embodiment explained above, respectively belonging individually to the transmission lines, when characters occur on a multiplicity of these incoming transmission lines, for example, for carrying-out specific control processes. In that case, the circuit arrangement illustrated in the drawing and explained above should be considered as a multiple impulse generator, so to speak.

I claim:

1. In a circuit arrangement for scanning the character elements of characters, respectively occurring with a prescribed duration, at arbitrarily determinable points, in particular for the correction of teletypewriter characters in which a scanner scans the individual character elements with the aid of scanning pulses produced by a pulse generator, and in which the scanning pulses can be fed to a scanning circuit together with the individual character elements, the improvement therein comprising:
   an adder circuit;
   a pulse-controlled multi-stage register in the pulse generator including an output connected to its input via said adder circuit so that code words contained in the register can respectively be altered by a prescribed value with every pulse actuation;
   a store including an input connected to the output of said register, said store containing stored control signals in specific storage locations which can be actuated by the code words of the register so that with the actuation of the respective storage locations, beginning after the start of the character is determined, the control signals contained in said storage locations cause the production of output pulses from the output of said store, which output pulses are applied as the desired scanning pulses.

2. The improved circuit arrangement of claim 1, wherein the input of said store is connected to the output of said register via said adder circuit.

3. The improved circuit arrangement of claim 1, further comprising:
   means for producing auxiliary timing pulses at the same frequency and phase-displaced relative to the timing pulses for the pulse-controlled register; and means for linking the auxiliary timing pulses with the output pulses of said store for forming the scanning pulses.

4. The improved circuit arrangement of claim 1, and further comprising:
   means in said store for outputting a separate character end signal to signal termination of the production of control signals in said store until an additional character to be scanned is determined.

5. The improved circuit arrangement of claim 1, further comprising:
   means for determining the occurrence of a character to be scanned including a monitor circuit comprising a bistable multivibrator which is operated to a first condition in response to the occurrence of a character to be scanned and producing a signal to release the production of pulses at said store, said multivibrator circuit also connected to receive a reset signal in response to the actuation of said store and responsive thereto to assume a second condition until the end of the respective character.

6. The improved circuit arrangement of claim 1, comprising:
   an addition circulating circuit including a read/write memory operable to be actuated when addressed and having a number of storage segments which correspond to the number of lines feeding the character to be scanned,
   said storage segments selectively controlled in response to the condition of the individual lines for the occurrence of the characters to be scanned, said addition circulating circuit including an input, a monitoring circuit connecting the input of said addition circulating circuit with all of the lines, said monitoring circuit including a multiplexer connected to the lines to be scanned,
   said store connected to and actuated by said addition circulating circuit,
   a demultiplexer connected to the output of said store and actuatable when addressed,
   an address generator connected to said auxiliary pulse generator and to said demultiplexer and operable, in cyclical sequence, during an interval which is shorter than the duration of the shortest character elements of a character to be expected, to output addresses for the consecutive actuation of all storage segments of the read/write store and for actuation of the multiplexer and demultiplexer so that all signal inputs of the multiplexer are consecutively connected to its signal output and all signal outputs of the demultiplexer are consecutively connected to its signal input.

7. The improved circuit arrangement of claim 6, wherein said demultiplexer and said read/write store are pulse-controlled devices.

8. The improved circuit arrangement of claim 7, comprising:
   a pulse-controlled auxiliary register connected between the output of said adder circuit and the input of said read/write store.

* * * * *